(12) United States Patent  (10) Patent No.: US 7,115,919 B2
Kodama  (45) Date of Patent:  Oct. 3, 2006

(54) STORAGE SYSTEM FOR CONTENT DISTRIBUTION

(75) Inventor: Shoji Kodama, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 793 days.

(21) Appl. No.: 10/104,779

(22) Filed: Mar. 21, 2002

(65) Prior Publication Data

US 2003/0236850 A1  Dec. 25, 2003

(51) Int. Cl.
  *G06F 17/30*  (2006.01)
(52) U.S. Cl. ....................... 257/201; 707/206
(58) Field of Classification Search ............... 707/201, 707/204, 10, 104.1; 370/222, 412; 703/25, 703/27; 709/250; 711/114, 162; 714/516; 716/4
  See application file for complete search history.

(56) References Cited

U.S. PATENT DOCUMENTS

| 5,594,491 | A | 1/1997 | Hodge et al. ............... 725/103 |
| 5,742,792 | A | 4/1998 | Yanai et al. ................ 711/162 |
| 5,768,511 | A | 6/1998 | Galvin et al. ............... 709/203 |
| 5,819,281 | A | 10/1998 | Cummins ............... 707/103 R |
| 5,933,603 | A | 8/1999 | Vahalia et al. .............. 709/225 |
| 5,933,653 | A | 8/1999 | Ofek ............................ 710/6 |
| 5,956,509 | A | 9/1999 | Kevner ....................... 719/330 |
| 6,029,175 | A | 2/2000 | Chow et al. ............. 707/104.1 |
| 6,058,416 | A | 5/2000 | Mukherjee et al. ......... 709/203 |
| 6,061,504 | A | 5/2000 | Tzelnic et al. .............. 709/219 |
| 6,094,680 | A | 7/2000 | Hokanson ................... 709/223 |
| 6,163,855 | A | 12/2000 | Shrivastava et al. ........... 714/4 |
| 6,173,377 | B1 | 1/2001 | Yanai et al. ................ 711/162 |
| 6,223,206 | B1 | 4/2001 | Dan et al. ................... 718/105 |
| 6,289,390 | B1 | 9/2001 | Kavner ....................... 719/310 |
| 6,633,538 | B1 * | 10/2003 | Tanaka et al. .............. 370/222 |

OTHER PUBLICATIONS

LinkPro Technologies, File Replication plus NAS enables Server-Less Remote Site Backup, copyright 2001, pp. 1-5.*
Scott Bekker, NetApp and Troka Partner for VI FC, Dec. 13, 2000, pp. 1-2.*
Dan Constantini, Network Attached Storage (NAS) and Storage Area Networks (SAN), Nov. 11, 1999, pp. 1-3.*
NetComm Solutions, The SAN cure For Storage Woes, May 2001, pp. 1-3.*

* cited by examiner

*Primary Examiner*—Apu Mofiz
(74) *Attorney, Agent, or Firm*—Townsend and Townsend and Crew LLP

(57) ABSTRACT

A processing system comprises a primary storage system and a plurality of secondary storage systems. The primary storage system is managed by a contents manager that keeps a file system used to make file level I/O accesses to a controller that translates the file access to block I/O to access the magnetic media for the data. The secondary storage systems are available to and accessed by application servers, also using file level I/O. The content manager may change a file or data on the primary storage system and, if so, will also change the file system accordingly. The file system is then made available to the application servers, after the controller transfers changed files to the secondary storage systems using block level I/O.

10 Claims, 17 Drawing Sheets

System Configuration
(Global)

| Name | Mount Point | Master | Server | Volume | |
|---|---|---|---|---|---|
| CONF1 | /mnt1 | Server A1 | Server A1 | Storage System A | Volume A1 |
| | | | Server A3 | Storage System A | Volume A2 |
| | | | Server B1 | Storage System B | Volume B1 |
| | | | Server B2 | Storage System B | Volume B1 |
| | | | Server C2 | Storage System C | Volume C1 |
| CONF2 | /mnt2 | Server A4 | Server A5 | Storage System A | Volume A5 |
| | | | Server A4 | Storage System A | Volume A4 |
| | | | Server B8 | Storage System B | Volume B8 |
| | | | Server C1 | Storage System C | Volume C4 |
| ⋮ | ⋮ | ⋮ | ⋮ | ⋮ | ⋮ |
| CONFm | /mntm | Server A3 | Volume A3 | Storage System A | Volume A3 |
| | | | Volume B1 | Storage System B | Volume B1 |
| | | | Volume C4 | Storage System C | Volume C4 |

Global Mount Points Table

FIG_2

| Volume | | Mount Point |
|---|---|---|
| Storage System B | Volume B1 | /mnt1 |
| Storage System B | Volume B2 | /mnt2 |
| Storage System B | Volume B3 | /mnt3 |
| ⋮ | ⋮ | ⋮ |
| Storage System B | Volume B4 | /mnt4 |

Local Mount Points Table
of Server B1

FIG_3

| Pair | Primary Volume | | Secondary Volume | |
|---|---|---|---|---|
| PAIR1 | Storage System A | Volume A1 | Storage System A | Volume A2 |
| | | | Storage System B | Volume B3 |
| | | | Storage System C | Volume C7 |
| PAIR2 | Storage System A | Volume A5 | Storage System A | Volume A4 |
| | | | Storage System B | Volume B8 |
| | | | Storage System C | Volume C1 |
| ⋮ | ⋮ | ⋮ | ⋮ | ⋮ |
| PAIRn | Storage System A | Volume A3 | Storage System B | Volume B1 |
| | | | Storage System C | Volume C4 |

Pair Table

FIG_4

| File Name | inode # |
|---|---|
| file1 | 1 |
| file2 | 2 |
| file3 | 3 |
| ⋮ | ⋮ |
| file n | n |

*Directory List of a directory abc/*

FIG-5

| Inode # | 10 | | | |
|---|---|---|---|---|
| Date | 12/31/05 | | | |
| Size | 100MB | | | |
| New File | Yes | | | |
| Direct 1 | Storage System A | Volume A1 | Block 2 | New |
| Direct 2 | Storage System A | Volume A1 | Block 2 | New |
| Direct 3 | Storage System A | Volume A1 | Block 2 | New |
| ⋮ | ⋮ | ⋮ | ⋮ | ⋮ |
| Direct n | Storage System A | Volume A1 | Block 2 | New |

*Inode Information*

FIG-6

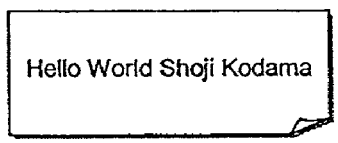
FIG_7A
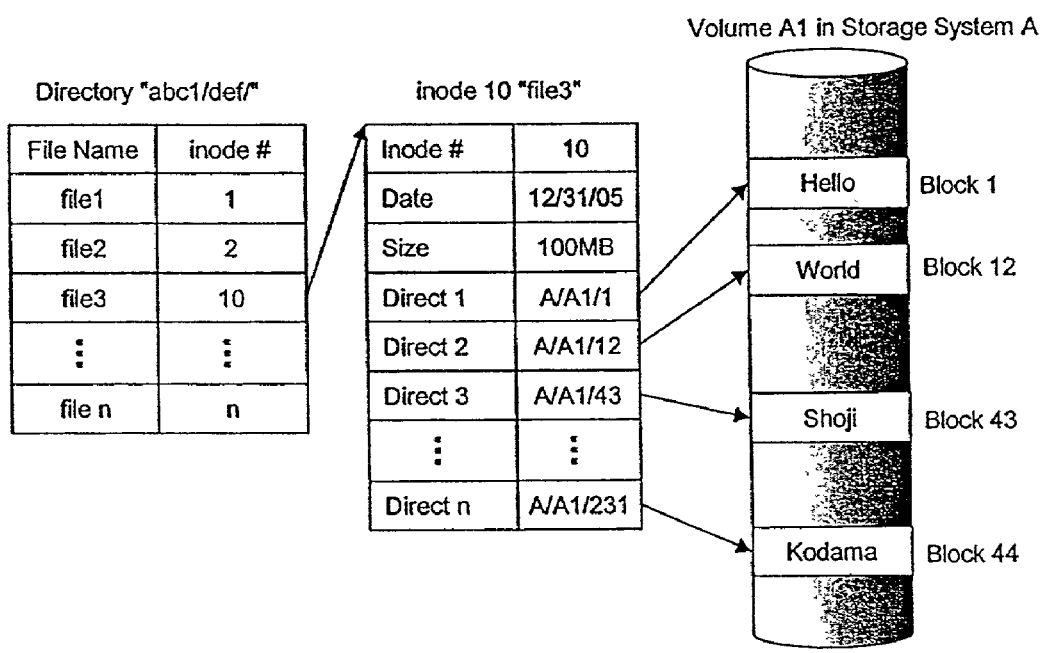
*How file3 is stored and managed by file system (Graphical Explanation)*
FIG_7B

| File Name | new inode # |
|---|---|
| abc/def/file1 | 12 |
| abc/def/file2 | 32 |
| abc/def/file3 | 11 |
| ⋮ | ⋮ |
| abc/def/file n | n |

*Updated Inode List*

FIG-8

| Block# | | | Availability |
|---|---|---|---|
| Storage System A | Volume A1 | Block 1 | No |
| Storage System A | Volume A1 | Block 2 | No |
| Storage System A | Volume A1 | Block 3 | Yes |
| ⋮ | ⋮ | ⋮ | ⋮ |
| Storage System A | Volume A1 | Block n | Yes |

*Available Blocks List*

FIG-9

| inode# | Availability |
|---|---|
| 1 | No |
| 2 | No |
| 3 | Yes |
| ⋮ | ⋮ |
| n | Yes |

*Available Inodes List*

FIG-10

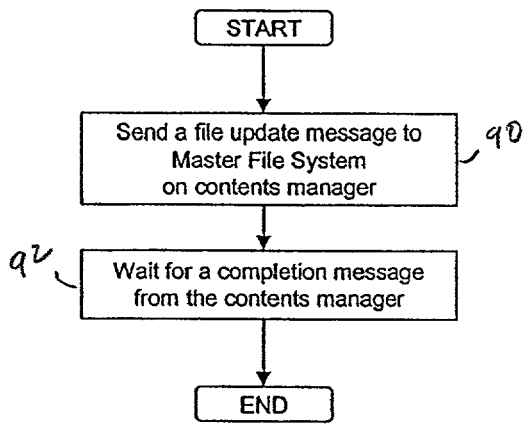
Sequence of File Update Program
FIG_12
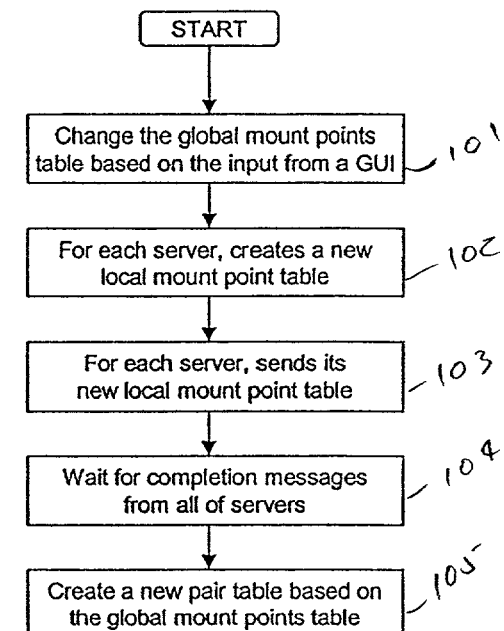
Sequence of Config Change Program
FIG_13
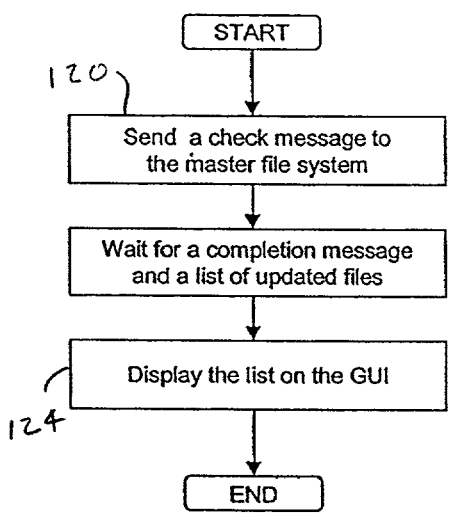
Sequence of Updated File Check Program
FIG_14
| File Descriptor | inode# | Availability |
|---|---|---|
| 1 | 4 | No |
| 2 | 14 | No |
| 3 |  | Yes |
| ⋮ | ⋮ | ⋮ |
| n | 76 | No |
Opened inode List
FIG_11

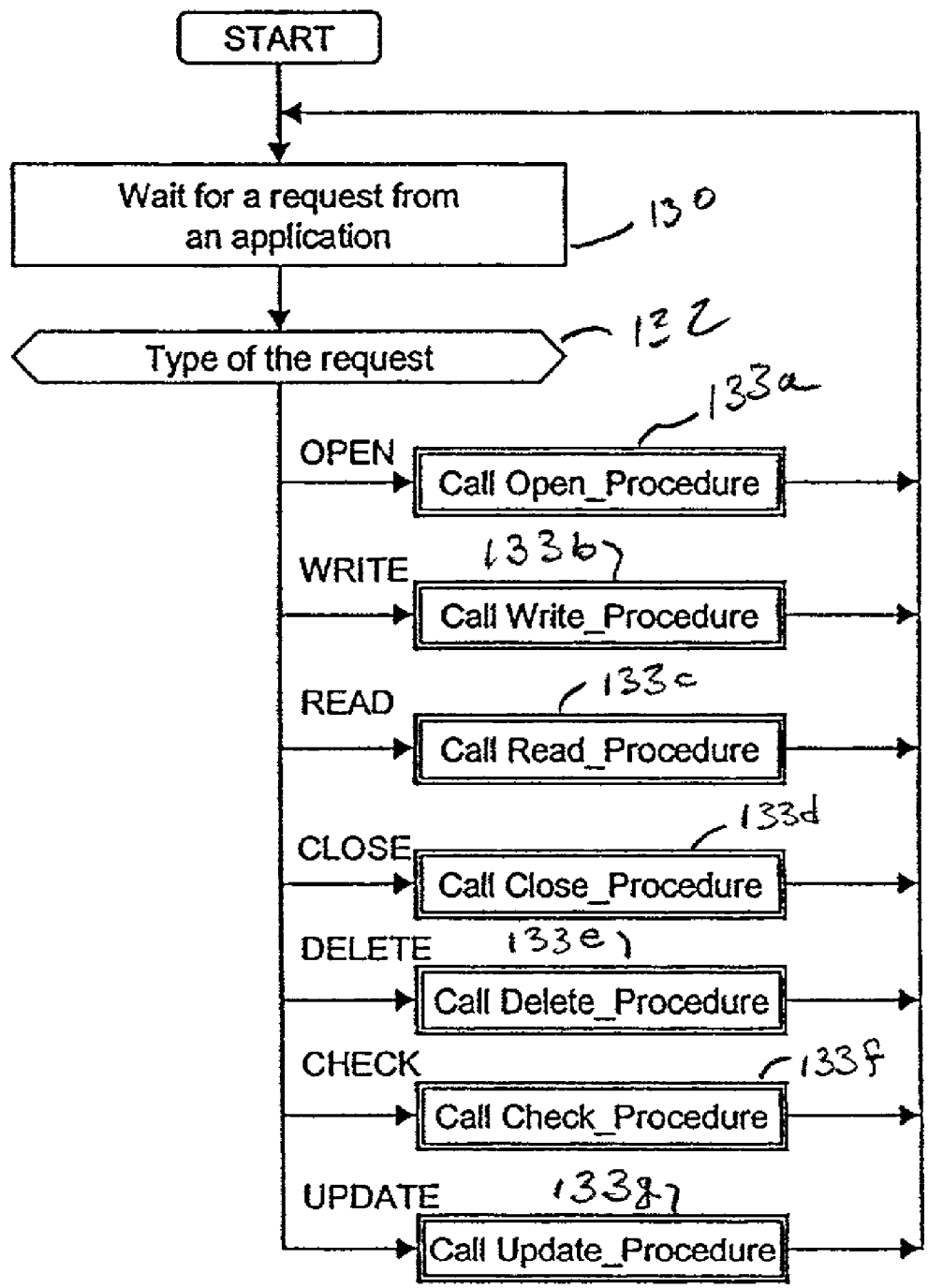
Process Sequence of Master File System
FIG_15

Sequence of Open_Procedure of Master File System

*How to change the content in the file (Graphical Instruction)*

*Sequence of Write_Procedure of Master File System*

*Sequence of Read_Procedure of Master File System and Client File System*

*Sequence of Close_Procedure of Master File System*

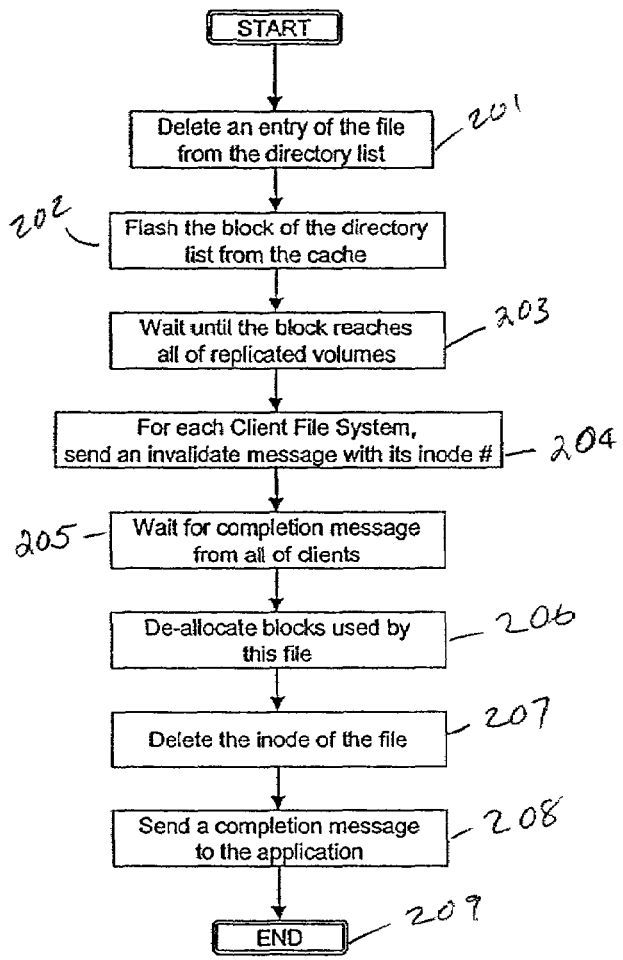
Sequence of Delete_Procedure of Master File System
FIG_21
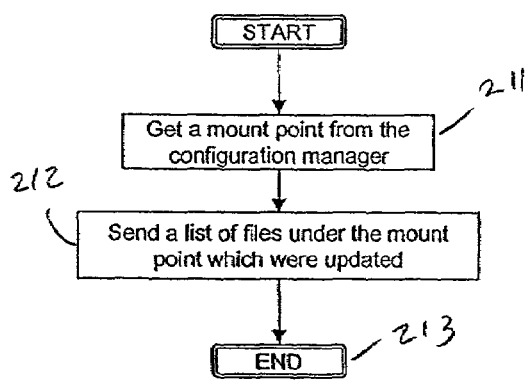
Sequence of Check_Procedure of Master File System
FIG_22

Sequence of Update_Procedure of Master File System

Process Sequence of Mount Client

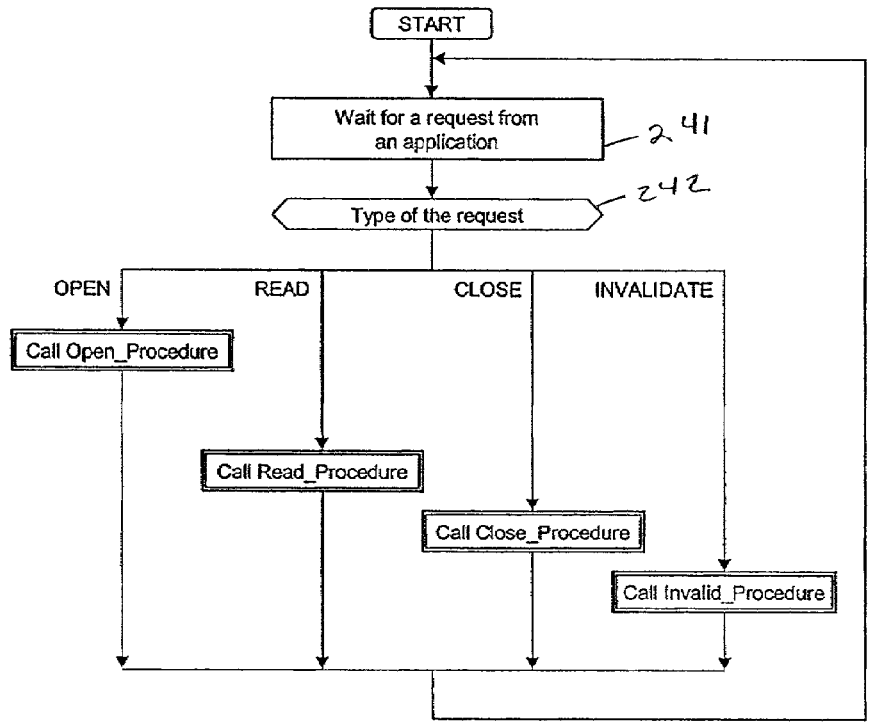
*Process Sequence of Client File System*
FIG_25
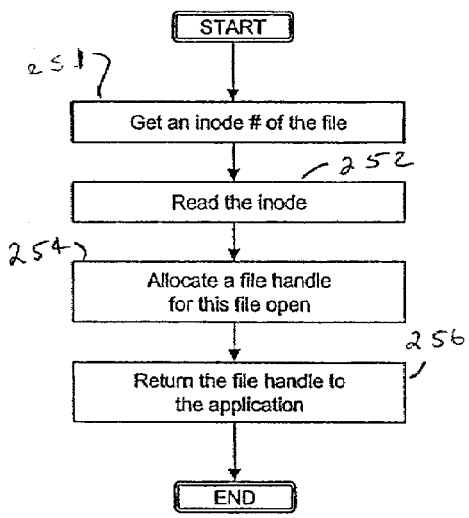
*Sequence of Open_Procedure of Client File System*
FIG_26
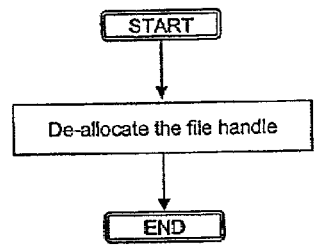
*Sequence of Close_Procedure of Client File System*
FIG_27

*Process Sequence of Block I/O Process*

*Sequence of Read_Procedure of Block I/O Process*

*Sequence of Invalid_Procedure of Client File System*

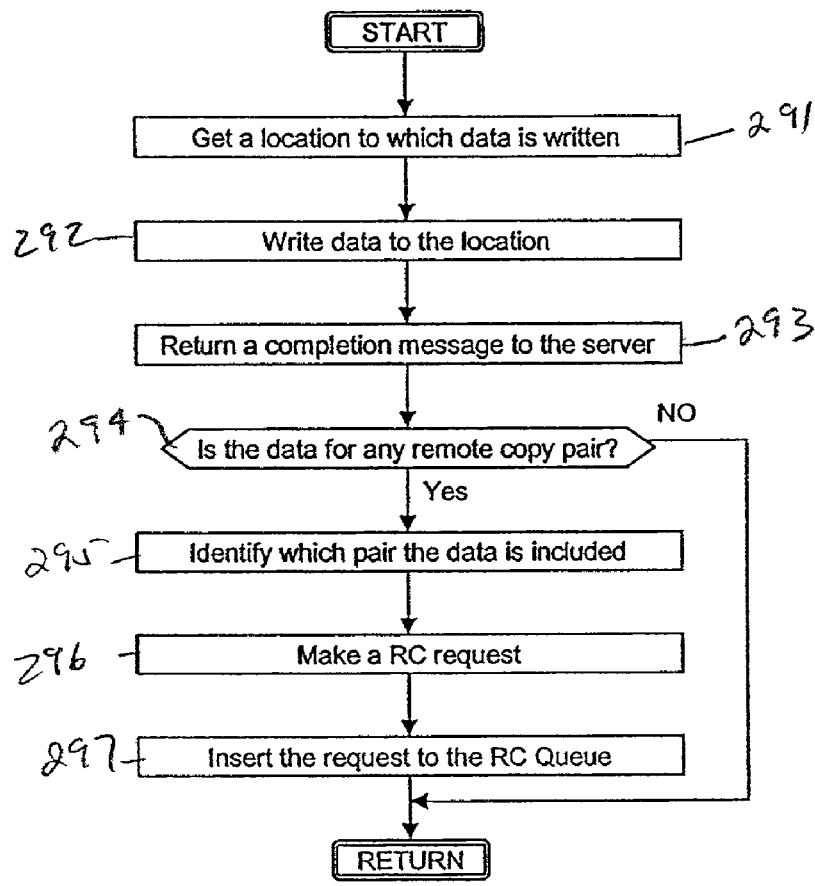
*Sequence of Write_Procedure of Block I/O Process*
FIG_31
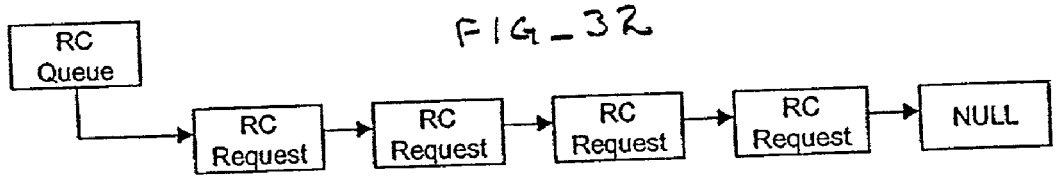
*Format of RC Request*
FIG_32
*RC Queue*
FIG_33

*Process Sequence of Remote Copy Process*

*Send_Procedure*

STORAGE SYSTEM FOR CONTENT DISTRIBUTION

BACKGROUND OF THE INVENTION

The present invention relates generally to a data processing system, and more particularly to a storage system capable of transferring block level I/O data from a primary storage system to a number of secondary storage systems. The data location information, in the form of a file system, is transferred separately to the users of the secondary storage systems.

Today's availability of massive storage systems, and the ready access to such storage systems though the Internet, has created a demand for such applications as, for example, video viewing on a real-time basis for both entertainment and education. Use of the Internet, for example, as the communicative medium allows video files to be transferred for viewing virtually anywhere in the world. However, making even large storage systems available to large numbers of users carries with it certain problems, not the least of which is the degradation in performance that can result from the bottleneck that most likely will arise when many users attempt to access the same file at about the same time.

One solution is to provide multiple data centers at different locations to distribute the access load that can be expected from the users. This would allow multiple users to access (video) files at one of a number locations. A primary location, such as a movie studio in the case of video files (motion pictures) can distribute the file to all data centers.

Video files are, however, usually managed by a file system of an operating system. Applications, such as a video server running on the operating system, will treat a video as a file due to ease of access. Generally, transfers of video files use file level I/O such as the File Transfer Protocol (FTP) to copy a file from one server to another server via a TCP/IP network. This protocol assumes that data is stored on a file system.

However, data transfer methods based on a file suffer from low data transfer rates that result from the often large overhead of a file system. File systems often employ a logical file management system in which logical "volumes" map to predetermined portions of a storage space, usually implemented with a number of disk devices. To read and/or write a file, the file system also reads and writes the meta data of the file, the information describing the file which often identifies where the file is stored on the volume and its related properties such as the file's name, its size, its last accessed time, and so on. The meta data is also stored on the volume, so the meta data operations accompanying a read and/or write operation on a file can be a drain on CPU power and an I/O bandwidth. This is why the transfer rate based on a file transfer is slow.

There are services capable of providing a file distribution service. Akamai and Digital Island are a few examples of such services, and usually use a file-based data transfer method such as described above and, therefore, suffer the problems mentioned. There is also a remote copy method that provides a block level data transfer. This transfer method is described in U.S. Pat. No. 5,742,792. But, the transfer methods used are not structured for use by applications employing file systems. This means even if the data copy was performed, no application or file system can work with the transferred data.

BRIEF SUMMARY OF THE INVENTION

This invention is directed to a processing system having multiple copies of data distributed from a primary or master storage system to a number of secondary storage systems. The invention provides a system and a method that allows applications executing on servers to make file-level I/O accesses to the storage systems, yet permit data transfers between the storage systems to use block-level I/O.

According to the invention, a processing system includes two or more data centers. A primary data center has a management console, at least one content manager, a storage system for storing original data, and may have an application server. The other data center(s) include an application server and a storage system. At the primary data center, the management console, content manager, and the application server, if any, are communicatively interconnected by a first network and to the associated storage system by a second network. The original data maintained by the storage system of the primary data center is mirrored on the remainder of the (secondary) storage systems of the other data centers. The storage system of the primary data center and the storage systems of the other data centers are connected via a third network. The management console and content manager are coupled to the primary storage system for data access thereto, and the application servers connect for access to one or another of the secondary storage systems. Application processes executing at the data centers make file level I/O requests, while access to the storage media controlled by the storage systems uses block level I/O.

The content manager, in response to user input (e.g., a system administrator) through the management console, operates to configure the system. The content manager will also create the data structures that identify the location of data of files on the primary storage and are stored with the data.

Changes to the data (deletions, modifications, etc.) are reflected by changes to the data structures to identify the changed files and the location of the changes on the storage media. The changed data and corresponding data structures are made available to the secondary storage systems by a remote copy process executing on the primary storage system through data communication on the second network. The data structures of the content manager and the application servers are synchronized so that the application servers are made aware of the changes to the (mirrored) data maintained by the secondary storage systems.

Since the storage system of the primary data center copies the files from itself to the storage systems of the other data centers using block level transmission, there is no need to enlist the file systems. This permits and enhanced data transfer rate because CPU load or I/O bandwidth of the servers is not consumed.

BRIEF DESCRIPTION OF THE DRAWINGS

FIG. 2 is an illustration of a global mount points table that forms a part of the data structure managed by the contents manager of the data processing system of FIG. 1 to identify the location of files on the primary and secondary storage systems;

FIG. 3 is a illustration a pair table used to identify pairs of storage areas, each pair being a storage area of the primary storage system and a storage areas of one or more of the secondary storage systems;

FIG. 4 is an illustration of a local mount points table as may be used for the secondary storage systems;

FIG. 5 is an illustration of a directory list for a particular directory, containing information identifying which files are in the directory;

FIG. 6 is an example of inode list, identifying the location of a particular file and properties related to the file;

FIGS. 7A and 7B are diagrammatic illustrations of the relationship between the directory list of FIG. 5 and the inode list of FIG. 6;

FIG. 8 is an illustration of an updated inode list;

FIG. 9 illustrates an available blocks list;

FIG. 10 illustrates and available inodes list

FIG. 11 illustrates an opened inode list;

FIG. 12 is a flow diagram that illustrates a file update sequence;

FIG. 13 is a flow diagram of the steps take for a change of system configuration;

FIG. 14 is a flow diagram that illustrates the major steps taken for a file update check;

FIG. 15 shows the major steps taken by the master file system process to call a file operation procedure;

FIG. 25 shows the sequence steps taken by the client file system process to call a file system procedure;

FIG. 26 illustrates the steps taken by a call to the open procedure of the client file system process;

FIG. 27 illustrates the steps taken by a call to the close procedure of the client file system process;

FIG. 31 illustrates operation of a write procedure when called by the block I/O process of FIG. 29;

FIG. 32 is an illustration of a remote copy (RC) request as may be made by a write procedure;

FIG. 33 is an example of a remote copy queue as may be used by the storage system of FIG. 1;

DETAILED DESCRIPTION OF THE INVENTION

Overview

In accordance with the invention, a primary or master data center includes a primary processing facility and a storage system whereat is maintained a master copy of data. Stored with the data are data structures (directory lists, inode lists, and the like) that identify the location of the data. Periodically, changes to the data (deletions, modifications, etc.) are made to the data. The changes are written to a previously unused area of the storage media containing the data. Changes to the data are followed by modifications to the data structures to identify the location(s) of the changed data. Then, the changed data and data structure are placed on a remote copy queue. A remote copy process periodically scans the remote copy queue for any changes made since the last scan, and if changed data is found, the changed data, together with the associated modified data structure, will be copied to one or more secondary storage systems and made available to application servers coupled to the secondary storage systems.

When the primary processing facility is sure that the changed data and accompanying modified data structures have been received by the secondary storage systems, it will send a message to the application servers. Receipt of the message by the application servers puts them on notice that data has been changed. The application servers will then retrieve the modified data structure(s) from the associated storage so that the updated data is used and not the old (unchanged) data.

System Configuration

Figure 1:
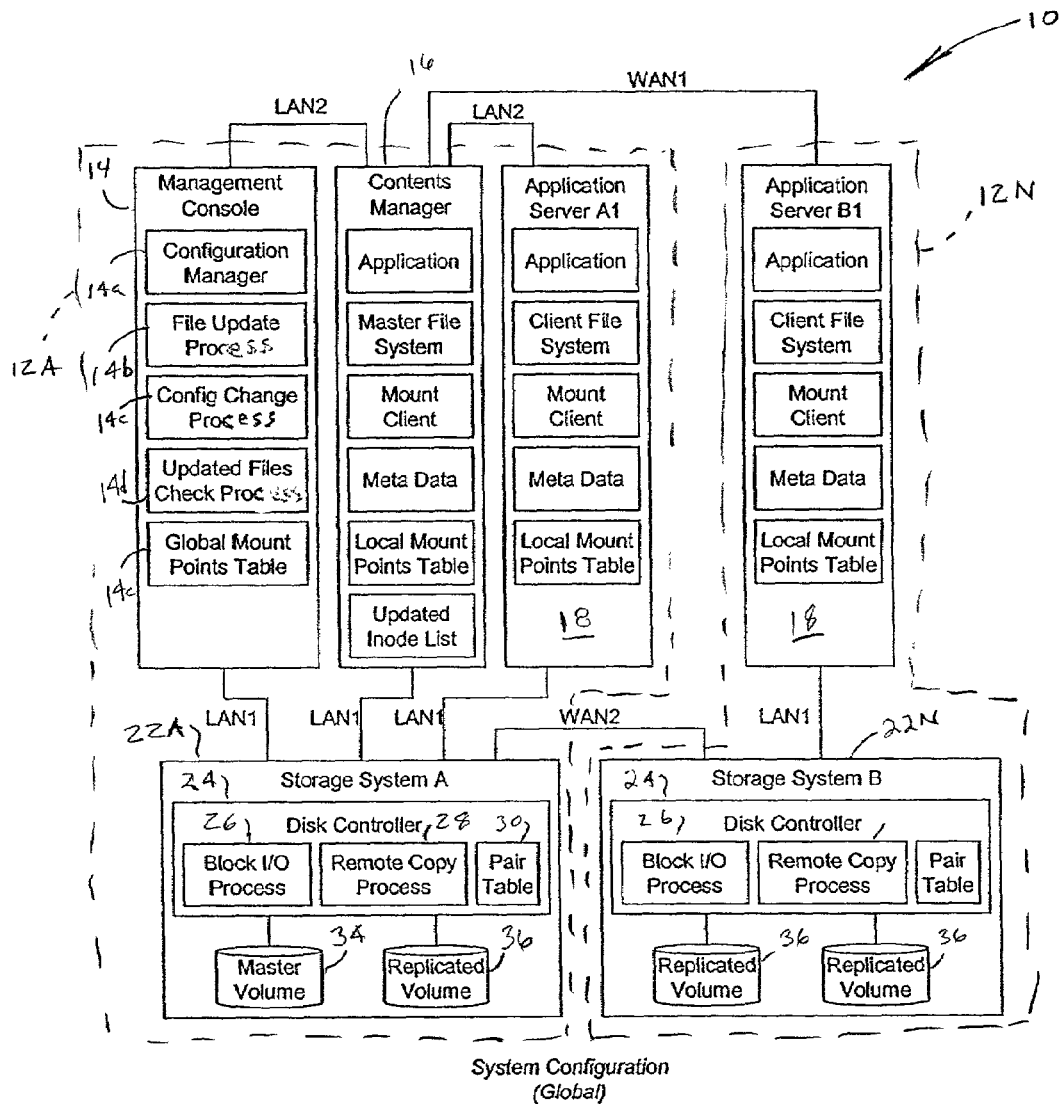
FIG. 1 is a block diagram of a representative data processing system, including a primary storage system and multiple secondary storage systems, configured to employ the present invention.

Turning now to the Figures, FIG. 1 is an illustration of a basic data processing system, designated generally with the reference numeral 10, employing the present invention. As FIG. 1 shows, the data processing system 10 may include a number of data centers, here illustrated by data centers 12A and 12N. The primary data center 12A includes a management console 14, a contents manager 16, and may or may not include an application server 18 and a storage system 22A. The other data centers 12, such as data center 12N, are application servers, each including a storage system 22N.

The management console 14, contents manager 16, and applications server 18 of the data centers 12A connect, through for example local area networks (LAN-1) to storage system 22A. Similarly, the application server 18 of the data center 12N connects to its associated storage 22N by a LAN connection. Each storage system 22A, 22N includes a disk controller 24 for executing block I/O and remote copy (RC) processes 26, 28, as described more fully below. In addition, each disk controller maintains a data structure called a pair table 30 which will also be described below.

The disk controllers 24 couple to storage media 34, 36, and preferably implements a "logical" storage in which one or more "volumes" map to magnetic disk storage units that implement the storage media 34, 36. Such logical storage makes it easier to respond to I/O requests from the servers (e.g., application servers 18, contents manager 16, etc.) of the data centers 12 using block level I/O to access the storage media. (As is conventional, an application process, executing for example on a server 18, will issue a file level I/O request to the file system of the server. In turn, the file system will issue the request as a block level I/O request to the storage system 24. While the storage system may not necessarily understand the data structure it can recognize the part that may be changed at a block level. This allows the storage system 24 of the data center 12A to send those changes to the other data centers 12 according to the present invention.) A master volume 34 receives and maintains a master copy of all data of the system. Using the RC process 28, the disk controller 24 of the data center 12A will copy that data, and any subsequent changes to that data, to the replicated volumes 36 of the other data centers 12. Thus, the replicated volumes 36 mirror the data of the master volume 34.

The logical storage implemented by the disk controllers 24 of the storage systems 22 to receive block level I/O type requests that initiate accesses to the storage media 34, 36. The contents manager 16 maintains the necessary data structures to locate files and, using file level I/O requests to the file system, which converts them to block level I/O for access to those files on the storage media. The management console 14 provides a means to configure the system 10, including the placement of those files on the storage media of the storage systems 22.

Note that, as FIG. 1 shows, the application servers 18 are communicatively coupled to the contents manager by either a local area network (LAN2) connection, or a wide area network (WAN1) connection, such as the Internet. The storage systems 22 are separately connected to one another, using a wide area network WAN2, which also may be an Internet or other network connection. When changes are made to the data image maintained on the master volume 34, those changes are written to an unused area of storage. Then, the various file structures used by the file system to locate that data are modified, and the modified file structures also written to storage. The resulting data image and file structure changes are subsequently copied from the storage media 34 to the replicated volumes 36 at a block I/O level from the storage system 22A to the other storage systems 22B, using the WAN2 connection. Also, the necessary paths to that changed data will be sent in file level I/O format, using the LAN2 and WAN1 communication paths from the contents manager 16 to the application servers 18. (Bob: What do you want to mean by the necessary paths and file level I/O format? I can't understand what this step means. The contents manager sends a message to the application servers via LAN and WAN1 and the message is used for flashing (in other word, invalidating) cached data in memory of the application servers so that the application servers don't use old data instead of new data in the secondary storage system.)

As FIG. 1 further shows, the management console executes, or has available to execute, a configuration manager process, a file update process, a configuration change process, and an updated files check program 14a, 14b, 14c, and 14d, respectively. These processes, as will be seen, manage and maintain a global mount point table 14e as well as performing other functions described below for configuring and changing the file structures for file level I/O accesses.

The contents manager executes (or has available to execute) an application process, a master file system, a mount client, that operate to maintain meta data describing each file storage on the storage system 22A, a local mount points table, and an updated inode list. The application servers each execute an application, client file system, and mount client that operate, among other things, to use meta data and a local mount points table for file level I/O accesses to the data of the storage systems 22.

The particular system architecture is representative, and it will be evident to those skilled in this art that other system designs may be used. For example, the applications may run on application servers that operate through file servers to access the data maintained by the storage systems 22. If so, the application servers need not install a client file system, because it will be implemented on the file server to read the files on the storage systems.

Tables

As noted above, the management console 14, contents manager 16, and application servers 18 maintain various data structures or tables in the implementation of this invention.

A description of those tables follows.

Global Mount Points Table

The global mount points table 14e is maintained by the management console 14, and contains information of the system configuration. FIG. 2 illustrates an example of the global mount points table. As FIG. 2 shows, the table may include in a column 40 a configuration name (e.g., CONF1, . . . , CONFm). For each configuration there will be a mount point (/mnt1, . . . , mntm) identified in column 42 and the name of a server (column 44) of a master file system. Columns 46, 48, and 50 respectively list the servers which use the files managed by the master file system, lists of volumes and the mapping between servers and volumes. The mount point is used to identify where the servers mount the volume. The mapping indicates which server uses which volume. A storage system and an identifier of a volume specify the volume in the storage system.

It could be that some sets of files are copied to specific data centers, while other sets of files are copied to other data center. This is the reason for multiple configurations. Each configuration identities different data sets diverse from one another.

Local Mount Points Table

Shown in FIG. 3 is a local mount points table, one of which exists in the content manager 16 and each application server 16 in the system. The local mount points table will contain information about which volume the unit (content manager or server) mounts. As FIG. 3 shows, a server B1 mounts a volume specified by Storage System B and Volume B1 onto a directory /mnt1. The local mount points table is created and distributed by the configuration manager process 14a.

Pair Table

The pair table 30 is managed by the disk controllers 24, and includes such information a which volume is mirrored by which other volumes. and which volumes are associated with which storage systems. An example of the structure and content of a pair table is illustrated by FIG. 4, which shows a pair table 30' as including in columns 56, 59, and 60, respectively containing a pair name, an identification of a primary volume associated with the pair name, and one or more secondary volumes. The pair name basically corresponds to the configuration name of the global mount points table. The primary volume is a volume which contains the original files, and is managed by the master file system process of the contents manager 16. The secondary volumes mirror the primary volume, and carry replications of the data of the primary volume. The secondary volumes are used by the application servers.

Directory List

The directory list is a table that, and one exists for each directory in a file system. The directory list contains information that identifies each file of the directory together with the inode numbers of each of the files. FIG. 5 is an example of the directory list, illustrating a representative directory abc as identifying files file1, file2, . . . , filen and their associated inode number a 1, 2, . . . , n, respectively.

Inode Information

As is conventional in file level systems, an inode will exist for each file in a file system, containing information for locating the file on the corresponding storage media 34 or 36 as well as properties related to the file. FIG. 6 is an illustration of representative inode information, showing that the file having an inode number 10, the file properties include a data when the file was last modified, the file size, a "New File" flag, and a list of directory ("Direct") entries. The New File flag is used by the master file system and shows whether the file exists when the file was opened. The directory entries (e.g., Direct 1, Direct 2, etc.) identify the locations of the various volumes data that form the file on the in the storage system. Each directory entry has associated with it a "New" flag which shows whether the locations are used by a current inode of the file. The details about this flag will explained more fully below. Thus, for example, the file with the inode number of 10 was last updated on Dec. 31, 2005, is 100 megabytes in size, and its component parts can be found in the block 1, 2, . . . n in volume A1 on storage system A.

FIGS. 7A and 7B illustrate the relationship between a file, the directory list, and the inode information when storing a file in a volume. FIG. 7A illustrates a file containing text, although it could just as easily be a video file or any other file. FIG. 7B shows that the file, having a filename of "file3," has an inode of "10." The inode with the number 10, locating the data parts that make up the file on the storage media: volume A1 in storage system A.

Updated Inode List

The updated inode list is a table containing information about which files were updated or created after a last file update was performed. Inodes associated with the updated files are also contained in this table. FIG. 8 is an example of the updated inode list. The File Name column identifies the file, and the "new inode #" identifies the inode assigned the (updated) file.

Available Block List

The available block list is a table that contains information about which locations in each master volume 43 are used and which locations are available to use. FIG. 9 is an example of an available block list. In this example, the availability flag (No/Yes) of the Block1 of the Volume A1 in the Storage System A is No. This means this location is used to store some file or the meta data. On the other hand, the Block3 of the same volume can be used to store a new file or an updated file.

Available Inode List

Similar to the available block list, the available inode list is a table identifying which inode numbers are used and which are available. FIG. 10 is an example of the list. When an availability flag of an inode number is Yes, the inode number is available. When it is No, the inode number is used to identify a file.

Opened Inode List

The opened inode list is a table that contains information about which file is presently in use (i.e., opened) by an application. FIG. 11 is an example of such a list. The list includes a file descriptor as an identifier for an opened file. As is common with some file systems, when an application opens a file, the file system will allocate a file descriptor for the file open. The application thereafter uses this file descriptor while the file remains open. In this example, the file descriptor 1 is being used by an associated file having an inode number of 4. On the other hand, the file descriptor 3 is not used by any application and, therefore, available for use.

Management Console

The management console is a processor unit that provides a graphic user interface (GUI) to, for example, a system administrator for configuring the system and to provide timed file updates. Even if files were updated by the contents manager, the contents cannot be seen by the application server without telling the timing from the management console.

GUIs

The management console 14 operates to drive a graphic user interface (GUI; not shown) to allow one (e.g., a system administrator) Configuration changes will result in a GUI call to a Mount Point Update process for execution on the management console.

In addition, the GUI can provide a system administrator a means for timing file updates. The administrator can specify a configuration name and then just pushes the OK button to tell the contents manager the timing. To make it easy to understand which files were updated for the specified configuration, a GUI screen (not shown) can provide a list of updated files. The Updated File Check Program 14d (FIG. 1) provides this list when called by the GUI.

File Update Process

As indicated above, this process is called by the GUI of the configuration manager process 14a. The File Update process (14b) will communicate with the contents manager 16 to request an identification of updated files to be sent to the application servers 18. FIG. 12 shows the steps taken by the File Update process 14a. It sends a file update message (step 90) to the master file system which is running on the contents manager and (step 92) then waits for a completion message from the master file system.

Config Change Program

This program is called by the GUI of the configuration manager process 14a, and creates the global mount points table 14e (FIG. 2), the pair table 30 (FIG. 4) and local mount points tables (FIG. 3) based on input information from a system administrator via the GUI. FIG. 13 is an illustration of operation of the config change program.

In step 101 an input from the GUI is received to effect a change in the global mount points table based on that input. Next, in step 102, for each application server 18, it creates a new local mount points table for the server based on the global mount points tables, where the servers include the contents manager and the application servers. For each server, the config change program will send (step 103) the new local mount points table to the servers 18 of the system 10. The, in step 104, the config change program will wait for completion messages from all of the servers. Then, in step 105 it creates a new pair table based on the global mount points table. In step 106 the config change program will send the new pair table to the storage system 22A (FIG. 1).

The config change process will then, in step 107, wait for a completion message from the storage system, and when received, ends at step 108

Updated File Check Program

The updated file check program 14d is also called by the GUI of the configuration manager to check which files were updated after the last file update was performed. FIG. 14 illustrates the sequence of operation, beginning with step 120 by sending a check message with a mount point to the master file system of the contents manager 16. The master file system will then return a list of updated files under the mount point for which, in step 122, the updated file check program waits. When the list is received (step 124), it will be presented on a display (not shown) of the GUI.

Contents Manager

The contents manager 16 operates basically a server to update files. When files are created, updated or deleted, the meta data maintained by the contents manager, which includes the directory lists, the available blocks list, the inode information, and the available inode list, is also changed. The client file systems kept by the application servers 18 will share the directory lists and the inode information with the master file system. The shared inode information is not changed by the master file system; only a new inode is created, even if the request was for a modification of a file. Also, there are no changes of any data on blocks already used by the file. The master file system will change the directory lists preferably in an atomic manner so as not to ensure inconsistency between the master file system and the client file systems.

Master File System

The master file system process executing on the contents manager 16 operates to create, update, and delete files in the master volumes 34. As explained, each master volume is mirrored by multiple replicated volumes 36. Updates to the master volumes 34 are copied, by the remote copy process 28, executing on the disk controller 24, to the replicated (on a timed basis, as indicated above) to the replicated volumes 36 for use by read by the client file systems of the application servers 18. Thereby, consistency between the data maintained on the master volumes 34 and the replicated volumes 36 is kept.

An application using the master file system process makes seven types of file level I/O requests: open, write, read, close, delete, check and update. The last two types are only used by the configuration manager.

FIG. 15 illustrates the steps of the operation of the master file system when handling the various received I/O requests. First (step 130) the process will wait for a request from an application. When a request is received, it is checked, in step 132, as to type (e.g., is it a request to open, close, write, etc. a file). Then, when they type of request is determined, the master file system process will make the call to one of the seven procedures 133 according to the type of the request.

Open Procedure

Figure 16:
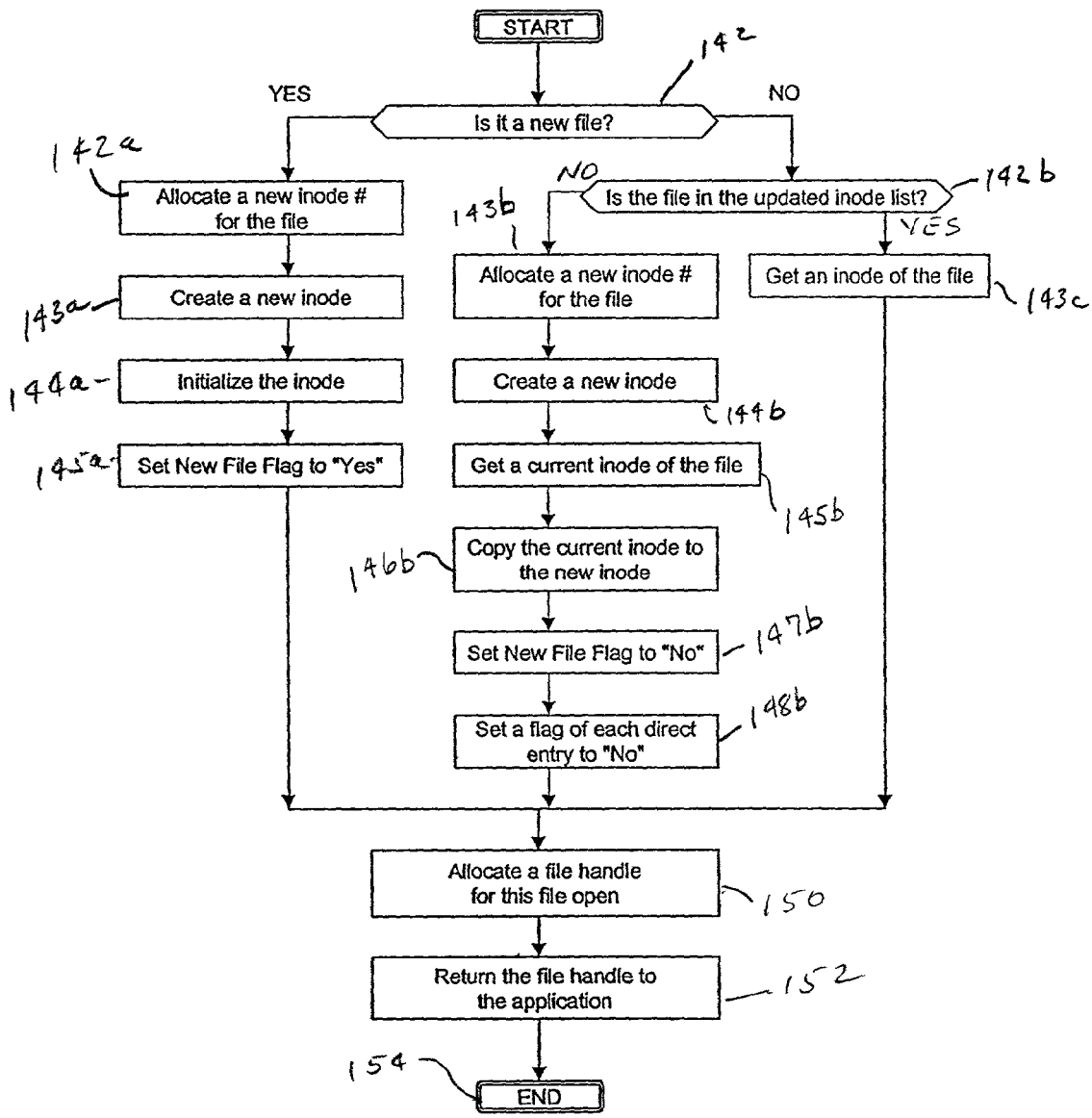
FIG. 16 is a flow diagram illustrating the open procedure called by the master file system.

The open procedure 133a is called by an application when it initiates use of a file. FIG. 16 shows the steps taken. There are three cases to consider: creation of a new file (case a), writing data to an existing file and it is the first time that the file was opened after the last file update (case b), and writing data to an existing file and it is the second time or later that the file was opened after the last file update (case c). To distinguish between the first case and the latter two cases, the new file flag in the inode information (FIG. 6) corresponding to the file is used. To distinguish between the second case and the third case, the updated inode list (FIG. 8) is consulted. The updated inode list identifies the inodes that have been opened after the last file update.

In the second case, the master file system does not change or the current inode of the file, but, rather, creates a new inode for the file. In the third case, the master file system just uses the inode in the updated inode list because the inode is owned by only the master file system.

Referring to FIG. 16, the open procedure will, in step 142, check to determine if a requested file is new. If so, it will proceed to step 142a; if not, step 142b. Step 142a results in allocation of a new inode number for the file from the available inode list (FIG. 10). Next, in step 143a, the procedure will create a new inode with the inode number selected from the available inode list, and store the inode information on a volume using several available blocks in the available blocks list.

Next, at step 144a, the open procedure will initialize the property field of the inode, its inode number, provide a created date, identify its size, and a list of direct entries. At step 145a the new file flag will be set to Yes. This will identify the file as being created after the last file update. The procedure will then proceed to steps 150, 152, discussed below.

Figure 17A:
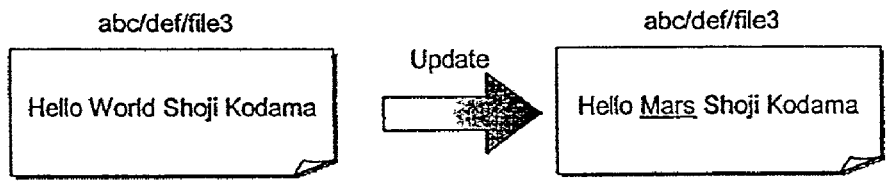
FIGS. 17A and 17B illustration selecting a new inode from the available inode list for use in modifying a file by the open procedure.
Figure 17B:
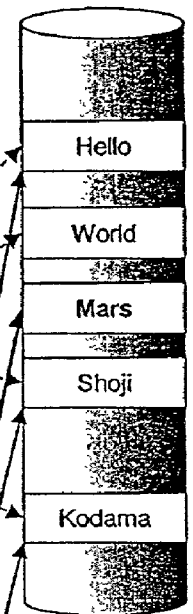

If the requested file is not new, the procedure will leave step 142 in favor of step 142b to check to see if the requested file is in the updated inode list. If so, the procedure proceeds to step 143c where a new inode number is allocated for the file from the available inode list. FIGS. 17A and 17B diagrammatically illustrate modification of a file ("file3" original inode number 10) and assignment of a new inode number ("11") to file3, and modification of the directory ("abc1/def/") containing the file.

Returning to FIG. 16, if the requested file is not in the updated inode list, step 143b will allocate a new inode number. Then, in step 144b, the open procedure will create a new inode with the new inode number. Next, in step 145b, the procedure will get the current inode of the file from a volume in a storage system or a cache memory. Then, in step 146b, the procedure will copy the content of the current inode information to the new inode information. This will be followed by step 147b where the new file flag is set in the new inode to "No." In step 148b, a flag of each directory (direct) entry is set in the inode to "No." This entry informs one that the block specified by the directory entry is used in the current inode of the file. The procedure will then proceed to steps 150, 152.

Step 150, the procedure allocates a file handle to the file open from the opened inode list. In step 152: the procedure returns the file handle to the application for use as a reference, ending with step 154.

Write Procedure

Figure 18:
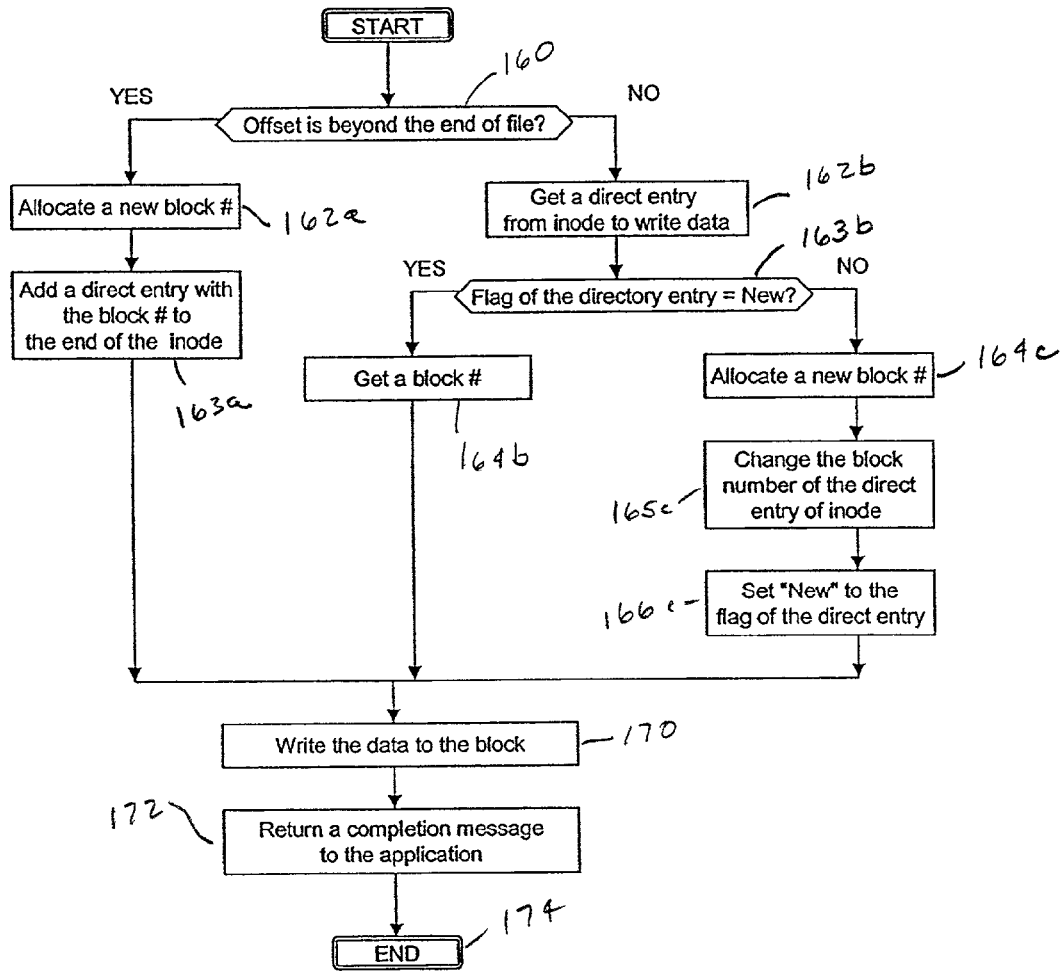
FIG. 18 is a flow diagram illustrating the write procedure called by the master file system.

The write procedure 133b is called to write data to a file, and the steps taken to do so are illustrated in FIG. 18. There are three cases to consider: writing data beyond the end of the file (case a), overwriting the file and the blocks to be written have been allocated after the last file update (case b), and overwriting the file and the blocks to be written are shared by the client file system on the application servers (case c). In case a, the master file system executing on the contents manager 16 (FIG. 1) will allocate new blocks for the file. In the second case, case b, the master file system allocates new blocks for the file to preclude writing data to shared resources. In case b, the blocks are used only by the master file system so the blocks are overwritten.

Referring to FIG. 18, the write procedure begins with Step 160 to check to see if the offset specified by the request is beyond the end of the file. If so, step 162a will follow. If not, the procedure proceeds to step 162b. As is conventional, the offset is an address from the top of the file.

At step 162a the write procedure will allocate a new block number from the available blocks list (FIG. 9). Then, in step 163a a new directory entry will be added with the block number to the end of the inode of the file. Also, the flag of the direct entry will be set to a "Yes," and step 163a exited in favor of steps Proceeds step 170, 172, discussed below.

If, on the other hand, the decision made in step 160 is negative, step 162b will follow with selection of a direct entry corresponding to the address from the inode of the file being written. Then, in step 163*b* a check of the flag is made of the direct entry. If it is "Yes," step 164*b* follows, if not, step 164*c*.

In step 164*b* the procedure will obtain a block number from the direct entry and proceeds to steps 170, 172.

If step 164*c* is to follow step 162*b*, the procedure will select a new block number from the available blocks (FIG. 9) list for allocation to the file of the request. FIGS. 17A and 17B also illustrate how the file is modified. In this figure the directory "direct 2" modified to identify a new location A/A1/20 for storing the new data ("Mars") added to the file (see FIG. 17A).

In step 165*c* the block number of the direct entry in the inode is changed to the new block number, and the following step 166*c* sets a flag of the new direct entry to "Yes."

In step 170, data is written to the location specified by the block number, and in step 172 a completion message is returned to the application making the I/O write request. The procedure then terminates with step 174

Read Procedure

Figure 19:
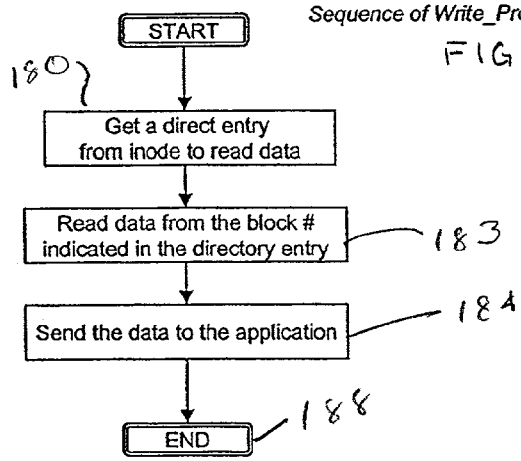
FIG. 19 is a flow diagram illustrating the read procedure called by the master file system.

The read procedure 133*c* is called to read data from a file, and is illustrated by FIG. 19. A read operation on a file does not require any changes of shared resources. So, the procedure merely reads the data identified in the request according to the inode of the file. Thus, as FIG. 19 shows, step 180 retrieves the direct entry corresponding to the address specified by an application from an inode of the file. Then, in step 183, the data is read from the location specified by a block number in the direct entry. Next, in step 184 the data is sent to the requesting application, and the procedure concludes with step 188.

Close Procedure

Figure 20:
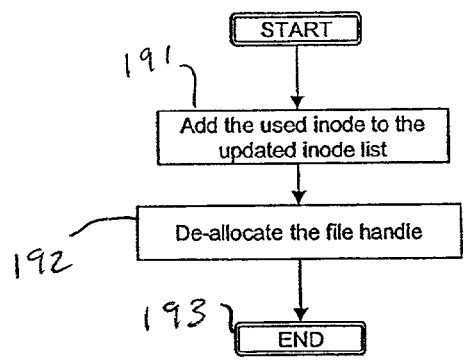
FIG. 20 is a flow diagram illustrating the close procedure called by the master file system.

This procedure is called to finish to use a file, and is illustrated by FIG. 20. The close procedure 133*d* begins with step 191 by adding the used inode and its file name to the updated inode list. this is followed by step 192 with a de-allocation of the file handle which was earlier assigned for use by the application. The entry of the file handle in the opened inode list is set to be Yes. The close procedure 133*d* then concludes with step 193.

Delete Procedure

Figures 21, 29:
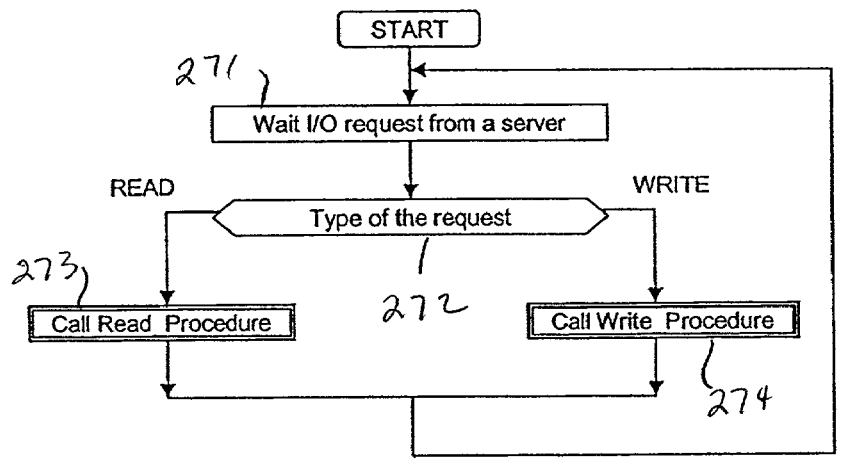
FIG. 21 is a flow diagram illustrating the delete procedure called by the master file system.
FIG. 29 shows the steps of the process sequence of a block I/O process executed by a storage system of FIG. 1.

This procedure, illustrated by FIG. 21, is called to delete an existing file. There is a possibility that the file desired to be deleted is presently in use by one or more of the application servers 18 when the close procedure 133*e* was called by the master file system. Deleting a file calls into play a number of resources shared by the master file system (executing on the contents manager 16) and the client file systems (executing on the application servers 18). So, before the master file system can change such shared resources, it must perform some synchronization between the master file system and the client file systems so that the applications running on the application servers 18 are made aware of such deletions of data.

Referring, then, to FIG. 21, steps 201 and 202 involve deleting an entry of the file from the directory list and flashing a block, which includes the directory list, from the cache memory to a storage system. This can be done without any synchronization because the size of the entry is small and is included in one segment. The segment is a unit to read and write data of a disk drive. So this operation is atomic.

There are three cases of the behaviors of the client file system. If the client file system is using the file, it can continue I/Os for the file because an inode information of the file and blocks allocated to the file have not yet been deleted. If the client file system is not using the file and the directory list which has had the file or the inode of the file are cached in a memory of the client file system, the client file system can still read the file. If the client file system is not using the file and doesn't cache the directory list and the inode of the file, the client file system cannot use the file anymore. Thus, in step 203, the master file system will wait until the block which has the modified entry reaches all of the storage systems. To do that, the master file system uses an interface of the storage system to check a status of a specific pair in which the block exists. The pair name is specified in this request.

In step 204 an invalidation message will be sent, with the inode number of the file, for each client file system, followed by waiting for completion messages from all of the client file system (step 205). When all expected completion messages are received, the master file system is ensured that no client file system is using the file to be deleted, no client file system has any inode information of the file, and all of the client file systems will read a new directory list which has been modified at step 201.

In step 206 the master file system will de-allocates all of the blocks used for the file. Then, in step 207 the inode of the file will be deleted, and of the blocks used for the inode will be de-allocated. In step 208 a completion message is then sent to the application requesting the deletion of the file, and the procedure ends with step 209.

Check Procedure

Figures 22, 30:
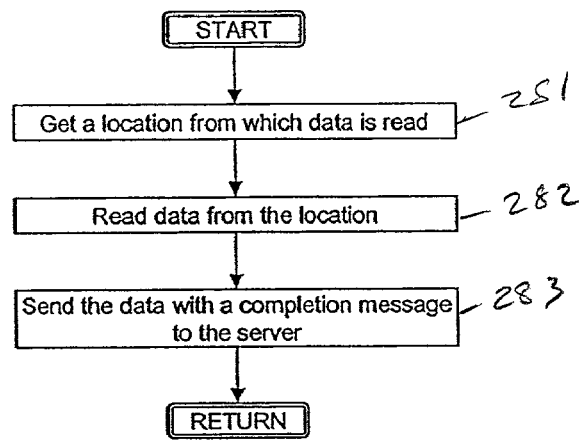
FIG. 22 is a flow diagram illustrating the check procedure called by the master file system.
FIG. 30 illustrates operation of a read procedure when called by the block I/O process of FIG. 29.

This procedure, illustrated by FIG. 22, is used by the configuration manager process 14*a* (executing on the management console 14 of the data center 12A; FIG. 1) to obtain an updated inode list. Beginning with step 211, a mount point is retrieved from the configuration manager. Then in step 212, the master file system sends a list of files which are stored under the mount point and are in the updated inode list to the configuration manager The procedure concludes with step 213.

Update Procedure

Figure 23:
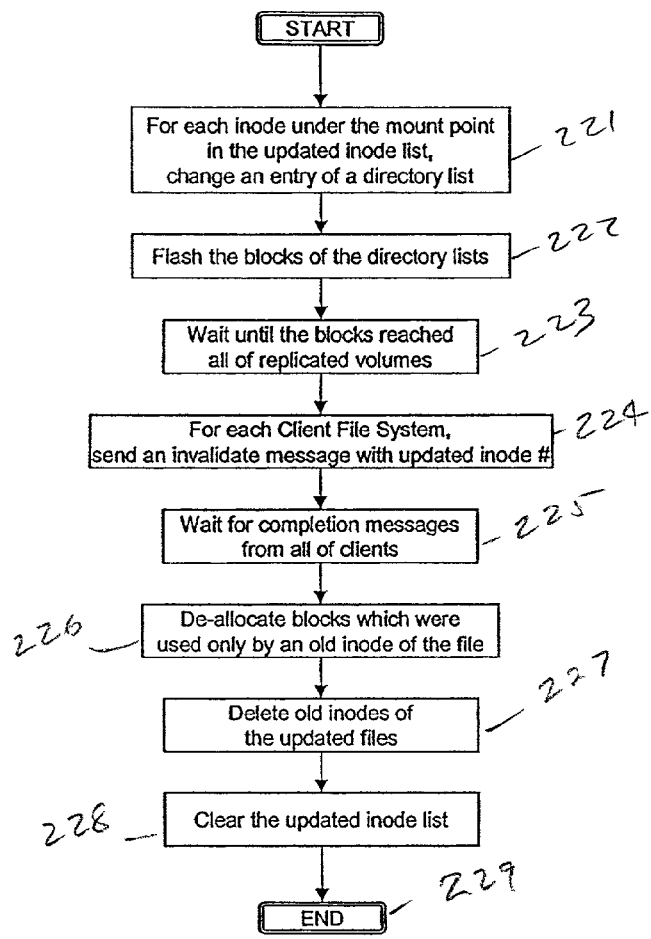
FIG. 23 is a flow diagram illustrating the update procedure called by the master file system to update the inode list.

This procedure is used by the configuration manager to update files in the updated inode list and is illustrated by FIG. 23. First, an update will change the directory list so that the application servers can use the new inodes of the updated files. After that all client file systems are told to invalidate their cached data corresponding to the directory list and the inode of the updated files. Without this step, there is the possibility that the client file system will continue to use outdated directory list and inode of an updated file. Finally, the master file system de-allocates and deletes information related to old inodes of the updated files.

Referring then to FIG. 23, in step 221, for new files in the updated inode list there will be added an entry in the corresponding directory list. For updated files in the updated inode list, the inode number of an entry in the corresponding directory list will be changed to the new inode number. In step 222 the blocks which include the modified directory lists will be flashed from the cache memory to a storage system, and in step 223 a wait is entered to allow the block to reach all of the storage systems. then, in step 224 an invalidation message is sent with the inode numbers of the updated files to each client file system. In step 225 the procedure waits for completion messages from all of the client file system.

Step 226 sees the procedure de-allocating all of blocks which were used only in the old inodes of the updated files. In step 227 the old inodes are deleted, and all of blocks used by the old inodes are de-allocated. Then, the updated inode list is cleared in step 228, and the procedure ends with step 229.

Mount Client

Figure 24:
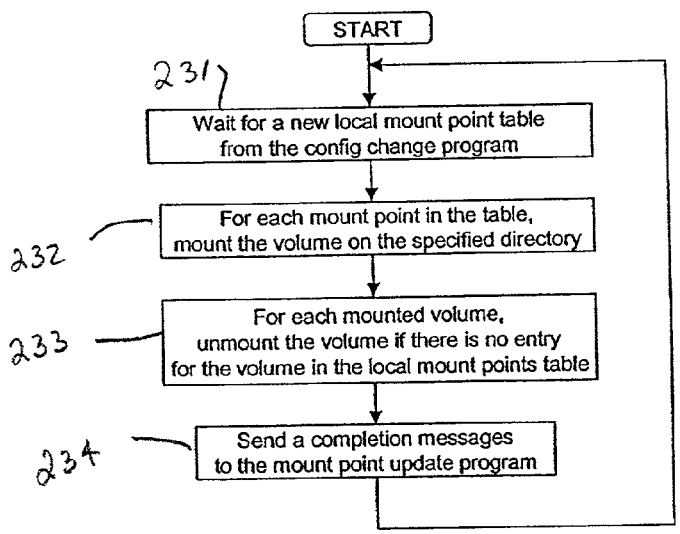
FIG. 24 is illustrates the sequence taken by the mount client process to mount new volumes to specific directories.

The mount client process of the contents manager 16 functions to mount new volumes to specific directories according to the local mount points table. This table is stored in each server so when the server reboots, the mount client uses the local mount points table to mount the volumes. After the reboots, the configuration manager will change the configuration of the system. In this case, the mount point update program on the configuration manager makes a local mount points table for each server and sends it to the server. So the mount client mounts and unmounts volumes according to the new local mount points table. FIG. 24 shows the sequence of the mount client process, which begins with step 231 by waiting for a new local mount points table from the configuration manager 14*a* executing on the management console 14. Then, for each mount point in the table, the volume will be mounted to the specified directory (step 232). In step 233, for each mounted volume on the server, if there is no entry for the volume in the local mount points table, it unmounts the volume, in step 234 a completion message will be sent to the mount point update program, and the procedure returns to step 231 to wait for a new change.

Application Server

The application servers 18 are servers that run applications, for example a video server. The applications use the files stored in the storage systems 22 through the client file system. The present invention assumes the applications don't modify the files but just read them.

Client File System

The client file is a process executing on the servers 18 for use in locating and reading files from a storage system 22, and needs no communication with the master file system. So, the client file system process provides interfaces to open a file, read a file, close a file and invalidate cached data to applications. The invalidation interface is used by only the master file system. FIG. 25 illustrates the steps taken by the client file system process to honor a request from the application running on the server 18 of the client file system.

As FIG. 25 shows, the client file system will, in step 241, wait for a request from an application. When a request is received, the process will, in step 242, call one of procedures (open, read, close, or invalid) according to the type of the request.

Open Procedure

The open procedure is called when an application starts to use a file. FIG. 26 shows the steps of an open operation, beginning with step 251 in which the process will retrieve an inode number of the file to be opened from a directory list. Then, in step 252 the inode information corresponding to the inode number is read from a storage system or a cache memory. In step 253 a file handle is allocated for this file open from the opened inode list, and returned to the application in file 256. Step 257 ends the procedure.

Read Procedure

This read procedure involves reading a file, and the steps to do so are basically the same as used for a read operation performed by the read operation of the master file system shown in FIG. 19.

Close Procedure

This procedure is called when an application finishes use of a file. FIG. 27 illustrates the major step of the procedure, involving only a de-allocation of the file handle.

Invalid Procedure

Figure 28:
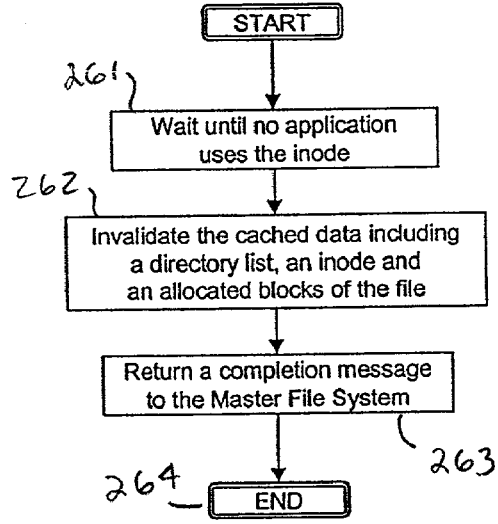
FIG. 28 illustrates the steps taken by a call to the invalidate procedure of the client file system process.

This procedure is called by the master file system of the contents manager 16 (FIG. 1) to invalidate cached data which have been updated by the master server. After the invalidation, the client file system reads an updated directory list, a new inode and so on when the application running the file system needs them. FIG. 28 is an illustration of the steps used. First, the procedure waits (step 261) until no application uses the inode specified by the request. Then, in step 262, the procedure will invalidate the cached data including a directory list in which the inode's entry exists, the inode itself, and blocks allocated to the file, and in step 263, send a completion message to the master file system, concluding with step 264.

Mount Client

The mount client mounts new volumes to specific directories according to the local mount points table. The steps taken by the mount client process are basically the same as those taken by the master file system and are, therefore, illustrated by FIG. 24.

Storage System

The storage systems 22 use logical storage techniques and, therefore, comprise multiple volumes including master volume 34 and replicated volumes 36, shown in FIG. 1. Each storage system will include at least one disk controller 24, and an I/O path between the disk controller and the volumes. The master volume is a volume which retains the original files and is managed by the master file system. The replicated volumes are each a replication of the master volume and used by the application servers.

On the disk controller, two processes are running, a block I/O process and a remote copy process. The block I/O process works for processing I/O requests from servers. The remote copy process works for copying data from a master volume to at least one replicated volume. The master volume and the replicated volume can be in the same storage system or in different storage systems. In case of the same storage system, data is copied via an internal I/O path. In case of the different storage systems, data is copied via a WAN network between the storage systems. The pair table indicates which volume is replicated to which volume.

Block I/O Process

FIG. 29 illustrates the steps of the block I/O process 26. In step 271 the block I/O process waits for an I/O request from a server. If a request is received, the process will check for the type in step 271. There are two types of requests, data read and data write. If the request is a read, step 273 will call a read procedure; if it is a write request, a write procedure is called. The procedure then returns to step 271 to wait for the next request.

FIG. 30 illustrates the read procedure. First of all, the procedure will get a location from which the block I/O process reads data (step 281). The I/O request from the server contains such kind of information. For example, the read command of SCSI protocol has SCSI target ID, LUN, offset and size of data. In this case, a location is specified by SCSI target ID, LUN, offset and size. The procedure will then read the data from the location (step 282) and send it to the server with a completion message (step 283).

FIG. 31 is an illustration of the write procedure called by the block I/O process. Beginning with step 291, the process will get a location to which the sent data is written. Then, it write the data to the location (step 292), followed by returning a completion message in step 293. Then, a check is made in step 294 to determine of the location is identified in any volume in the pair table (FIG. 4). If not, the procedure terminates with step 298. But, if so, the enters step 295 to identify which pair the location belongs to. It will, in step 6 create a remote copy (RC) request for this I/O. FIG. 32 is an example of the structure RC request.

As FIG. 32 shows, an RC request has 4 rows, primary, secondary, address and size. The primary identifies a primary volume information of the pair. The secondary is a secondary volume information of a pair. The address is an address at which data was written. The size is a size of the written data.

Returning to FIG. 31, in step 297 the procedure will insert the RC request in a RC Queue, which is a list of RC requests. The remote copy process uses this RC Queue to know which data need to be copied to which locations. FIG. 33 shows an example of an RC Queue, showing a number of RC requests.

Remote Copy Process

Figure 34:
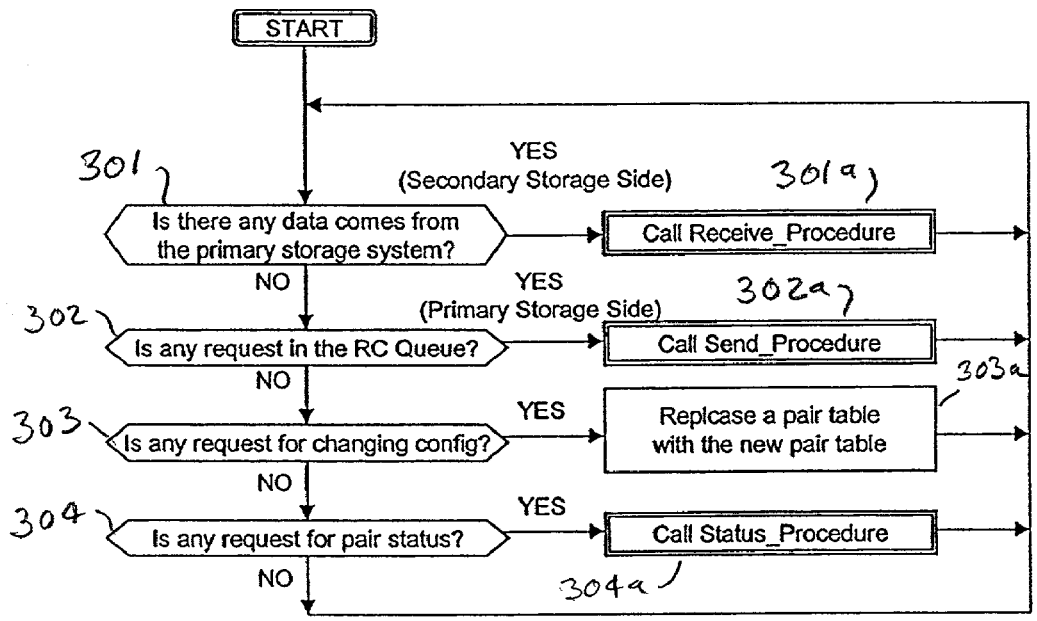
FIG. 34 illustrates the steps taken by a storage system of FIG. 1 pursuant to a remote copy process.

The remote copy process is illustrated in FIG. 34, and begins with step 301 to determine if there is any data coming from the primary storage system. If so, it will proceed to step 301a to call a receive procedure. If not, the process drops to step 302. This is a case that the remote copy process running on the secondary storage system receives an updated data from the primary storage system.

Step 302 determines if there are any RC requests pending in the RC Queue, and if so will call a send procedure in step 302a. If not, step 303 is used. This is a case that the remote copy process running on the primary storage system sends an updated data to the secondary storage system.

Step 303 checks to see if the RC queue contains any requests for changing configurations of the pair table, and if so will change the tables according to the request in step 303a. If not, proceeds step 4. This is a case that the configuration manager sends the request and the remote copy process reconfigures the tables.

In step 304 a check is made of the RC queue for any requests for a check of the status of a pair. If so, step 304a will call the status procedure; if not, a return to step 301 is made. This is a case that the master file system wants to know if all of updated data reach all of secondary storage systems.

Figure 35:
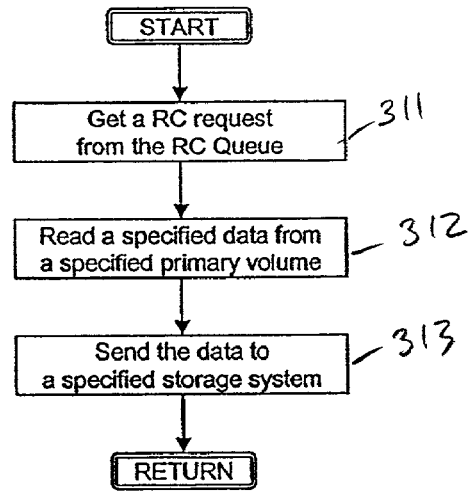
FIG. 35 shows the steps of the send procedure called by the remote copy process of FIG. 34.

The send procedure called by step 301a of the RC process is illustrated in FIG. 35. In step 311, the procedure will retrieve a RC request from the RC Queue, read the corresponding data of the request from the location specified by the request from the primary volume (step 312), and send that data to a specified storage system with an identifier of a secondary volume and a location (step 313).

Figure 36:
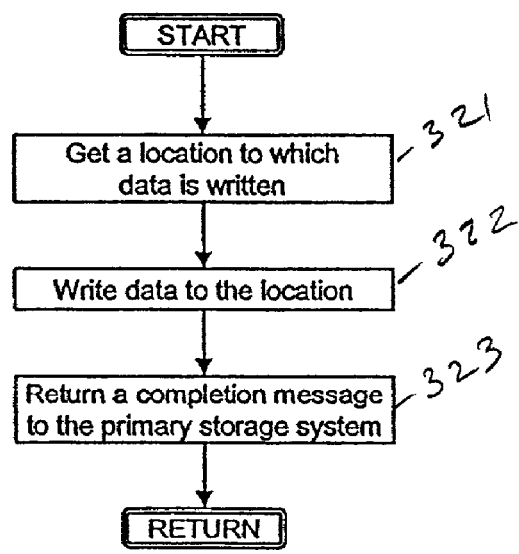
FIG. 36 shows the steps of the receive procedure called by the remote copy process of FIG. 34.

FIG. 36 illustrates the receive procedure. When called, the read procedure, in step 321, will get an identifier of a secondary volume and an address to which the received data is written. Then, in step 322, it writes the data to the location. Finally, in step 323, it sends a completion message to the primary storage system.

Figure 37:
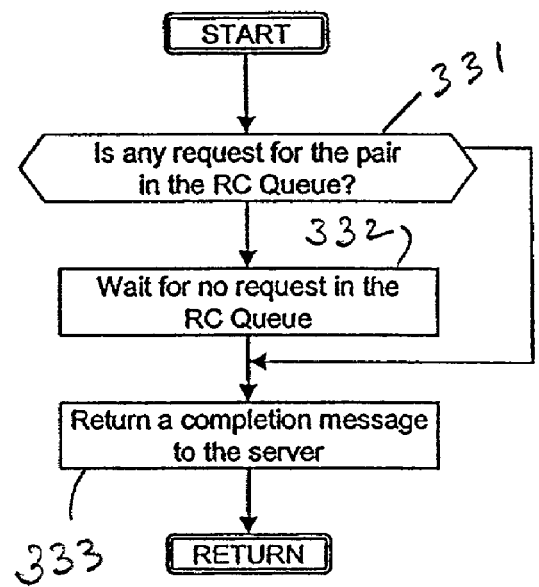
FIG. 37 shows the steps of the status procedure called by the remote copy process of FIG. 34.

FIG. 37 illustrates the status procedure called by step 304a of the remote copy process. When called, the procedure will, in step 331 will check to see if there is any RC request for the specified pair in the RC Queue. If such a request exists, the procedure will, in step 332, wait until all of requests for the pair finish, and then, in step 333, will return a completion message to the server. If, in step 331, it is determined that there is no RC request for the specified pair in the RC queue, the procedure will just sends a completion message to the server.

Conclusion

In summary, there has been disclosed apparatus and a method for distributing and sharing data among a number of clustered servers and distributed clustered servers where the servers are sharing data and they just read the data. Examples of such servers are web servers, video servers and contents distribution servers.

What is claimed is:

1. A data processing system comprising:
a master storage system, including storage media and a first disk controller for storing and accessing original data on the storage media;
a plurality of secondary storage systems each for storing copies of the original data, each of the secondary storage systems including a second disk controller, and each of the plurality of secondary storage systems being selectively in communication with the master storage system;
the first and second disk controllers operating to receive I/O requests for access to the original data and copies of the original data, respectively, and storing the data using block level I/O;
a manager processor coupled to the master storage system, the master processor having a file system process to respond to file level I/O requests from application programs for accessing the original data, the manager processor maintaining data structures identifying the locations of file data corresponding to the original data stored at the master storage system;
at least two server processors coupled to ones of plurality of secondary storage systems, each of the server processors having copies of at least portions of the data structures for locating file data on the secondary storage systems;
whereby when the manager processor writes changes to file data to make corresponding changes to the original data, the data structure are changed to identify the changed data, and the server processors are notified that the original data structures have been changed; and
whereby copies of the changed original data and changed data structure are sent by the master storage system to the secondary storage systems.

2. A data storage and distribution system, including a manager processor, a local data storage facility for storing a data image and a plurality of remote data facilities each for storing replications of the data image, the system comprising:
a file system executing on the manager processor operating to receive file level access requests to the local and remote data storage facilities;
a block level I/O access to the data image and replicated data images;
a replicator for transferring changes to the data image at the local data storage facility to the plurality of remote storage facilities using block level I/O for making corresponding changes to the replicated data images; and
wherein the local storage facility includes storage media for storing the data image and a controller operating to access the storage media, each of the remote storage facilities include storage media for storing the data image and a controller operating to access the associated storage media, and wherein the controllers each operate to receive and translate file level I/O requests to block level I/O requests to change the data image.

3. The data storage and distribution system of claim 2, each of the plurality of remote storage facilities having coupled thereto at least one server processor for accessing data contained in the replicated data image.

4. The data storage and distribution system of claim 2, wherein the controller in the local storage operates to perform a remote copy operation for each file level I/O request that changes the data image to copy the changes to the plurality of remote storage facilities.

5. The data storage and distribution system of claim 4, including at least one data structure maintained by the manager processor identifying locations of data in the data image.

6. The data storage and distribution system of claim 5, wherein the manager processor operates to change the data structure to identify locations of changes to the data manager.

7. The data storage and distribution system of claim 6, including at least one server processor coupled to each of the remote storage facilities and to the manager processor, the manager processor operating to forward the changed data structure to the server processors when the data image is changed.

8. A data processing system comprising:
- a first data center including a master storage for storing original data, the first data center maintaining a first data structure identifying locations of file data in the original data;
- a second data center including second storage for storing a copy of a least a portion of the original data, the second data center having a second data structure identifying locations of the portions of the original data;
- the first data center operating to perform at least one operation to write new data or to change the original data, changing also the first data structure to reflect such writing or change of the original data; and
- the master storage communicating to the second storage the written or changed data and the changed first data structure;
- the first data center notifying the second data center of the changed data and changed data structures, and
- wherein the communicated changed data structure is in file level I/O format and the written or changed data communicated to the second storage is in block level I/O format.

9. The data processing system of claim 8, wherein the master storage and the second storage comprise magnetic media.

10. The data processing system of claim 8, wherein the master storage and the second storage comprise disk storage.

* * * * *